United States Patent [19]

Bettman

[11] 4,098,958

[45] Jul. 4, 1978

[54] THERMOELECTRIC GENERATOR DEVICES AND METHODS

[75] Inventor: Max Bettman, Southfield, Mich.

[73] Assignee: Ford Motor Company, Dearborn, Mich.

[21] Appl. No.: 813,711

[22] Filed: Jul. 7, 1977

[51] Int. Cl.² .................. H01M 10/34; H01M 10/39; H01M 10/44
[52] U.S. Cl. ........................................ 429/17; 429/20; 429/11
[58] Field of Search ............................. 429/17, 20, 11

[56] References Cited

U.S. PATENT DOCUMENTS

| | | | |
|---|---|---|---|
| 3,458,356 | 7/1969 | Kummer | 429/11 |
| 3,511,715 | 5/1970 | Angus | 429/17 |

Primary Examiner—John H. Mack
Assistant Examiner—H. A. Feeley
Attorney, Agent, or Firm—Edmund C. Ross, Jr.; Keith L. Zerschling

[57] ABSTRACT

Thermoelectric generator devices and methods using, for example, alkali metal as a working fluid are disclosed. In operation, elemental alkali metal is ionized on the inside of an electrolyte tube to alkali metal cations, reconverted outside the tube to elemental alkali metal at a porous electrode, vaporized into a furnace zone in vapor communication with the porous electrode, discharged hydrodynamically from the furnace zone to a cooling zone, and collected as a liquid for return to the inside of the electrolyte tube. Essentially isothermal series electrical connection within the devices provides a means for reduction of heat conduction losses.

22 Claims, 4 Drawing Figures

THERMOELECTRIC GENERATOR DEVICES AND METHODS

This invention relates to thermoelectric generator devices and methods for converting heat energy directly to electrical energy.

More particularly, this invention relates to thermoelectric generator devices and methods which electrochemically expand alkali metal.

Still more particularly, this invention relates to thermoelectric generator devices and methods which utilize hydrodynamic flow of alkali metal vapor to a cooled collection zone. Still further, this invention relates to such devices and methods which can employ series electrical connection.

BACKGROUND OF THE INVENTION

Devices for conversion of heat energy to electrical energy by electrochemical expansion of a working substance across a solid electrolyte have been described heretofore. See, for example, U.S. Pat. Nos. 3,458,356 and 3,511,715.

Devices, using, for example, alkali metal as a working fluid, generally comprise a closed container separated into two different pressure regions by solid electrolyte. In the higher pressure region, alkali metal is in fluid contact with the electrolyte or electrode in electrical contact therewith. In the lower pressure region, a porous electrode is in electrical contact with the solid electrolyte. The vapor pressure differential between the regions causes migration of alkali metal cations through the solid electrolyte with concomitant loss of electrons to an external circuit. These electrons flow through the external circuit and recombine with cations passing out of the solid electrolyte at the porous electrode. Neutral alkali metal evaporates from the surface of the porous electrode and travels to a cooler collection zone for condensation as to a liquid and return to the higher pressure region whereby the cycle is completed.

Operation of such above described prior art devices was heretofore thought to be optimal when there is a maximum pressure difference between the higher and lower pressure regions. As a consequence, the vapor pressure of alkali metal in the lower pressure region was normally desired to be very low, i.e., in the range of millitorrs. At this pressure range, the pressure differential between the higher pressure region and lower pressure region would be greatest, leading to greatest predicated voltage outputs. Moreover, such prior art devices utilize a collection zone for alkali metal vapor which consists of cooled wall or walls of the lower pressure region onto which alkali metal condenses and drains for return to the higher pressure region. Heat radiation, however, deleteriously follows the path of this alkali metal to the cooled walls and to date effective means for reducing these radiative heat losses is not believed to have been accomplished.

In devices and method of this invention, vapor pressure in the lower pressure region is optimally maintained at a level sufficient to permit hydrodynamic flow, e.g., about 0.05 torr or higher, of the alkali metal vapor after its vaporization from the surface of the porous electrode. The alkali metal vapor in the lower pressure region can then pass hydrodynamically through shaped openings, e.g., slits, orifices, nozzles, which constrict the flow of vapor while minimizing heat radiation loss to the cooling condensers.

Advantageously, a plurality of high pressure regions now can be incorporated in accordance with this invention into one device thereby leading to greater predicted power outputs for the devices as compared to prior art devices and methods. Further, series electrical connection within the device can reduce conduction losses. Still further, fast hydrodynamic flow of alkali metal vapor through shaped openings can eliminate radiative heat losses as a matter of practical concern.

BRIEF DESCRIPTION OF THE INVENTION

One embodiment this invention comprises a thermoelectric generator device (with at least one series electrical connection) wherein heat energy is converted to electrical energy and alkali metal serves as a working fluid, such device comprising: (1) enclosure means for a first reaction zone; (2) enclosure means for a second reaction zone comprising a furnace wall; (3) reaction zone separation means which (a) separates and essentially completes enclosure of said first reaction zone and said second reaction zone, and (b) comprises at least two portions of cationically-conductive, electrolyte solids, said solids being individually essentially impermeable to elemental alkali metal and compounds thereof and ionically conductive with respect to cations of said alkali metal; (4) alkali metal within said first reaction zone and in respective fluid communication with said portions of electrolyte solids; (5) electrode elements within said second reaction zone and in respective electrical contact with said portions of electrolyte solids and sufficiently porous to permit alkali metal to pass therethrough; (6) conduction means (I) for electron flow between (a) a first portion of said alkali metal which is within said first reaction zone and in fluid communication with a first of said portions of electrolyte solids and (b) a first portion of said electrode elements within said second reaction zone which is in electrical contact with a second of said portions of electrolyte solids; and conduction means (II) for electron flow between (a) a second portion of said alkali metal which is within said first reaction zone and in fluid communication with said second of said portions of electrolyte solids and (b) a second portion of said electrode elements within said second reaction zone which is in electrical contact with either said first portion of, or still another of said portions of electrolyte solids; (7) inlet means for introducing said portions of alkali metal, electrically insulated from one another, into said first reaction zone so as to be in respective fluid communication with said portions of said electrolyte solids; (8) temperature control means adapted to maintain a temperature in said first reaction zone in a range at least 100° C in excess of the lowest temperature in said second reaction zone and a temperature of said furnace wall in a range in excess of said lowest temperature; and (9) means for collection within said second reaction zone of alkali metal vapor which comprises: (a) a furnace zone in vapor communication with said portions of electrode elements and surrounded by said furnace wall; (b) cooling means for alkali metal adapted to maintain said lowest temperature; and (c) shaped opening means in said furnace wall for discharging said alkali metal vapor from said furnace to said cooling means.

This invention also includes methods for converting heat energy directly to electrical energy with, for example, alkali metal serving as the working fluid as well as thermoelectric devices with only parallel electrical connection.

DETAILED DESCRIPTION OF THE INVENTION

Figure 1:
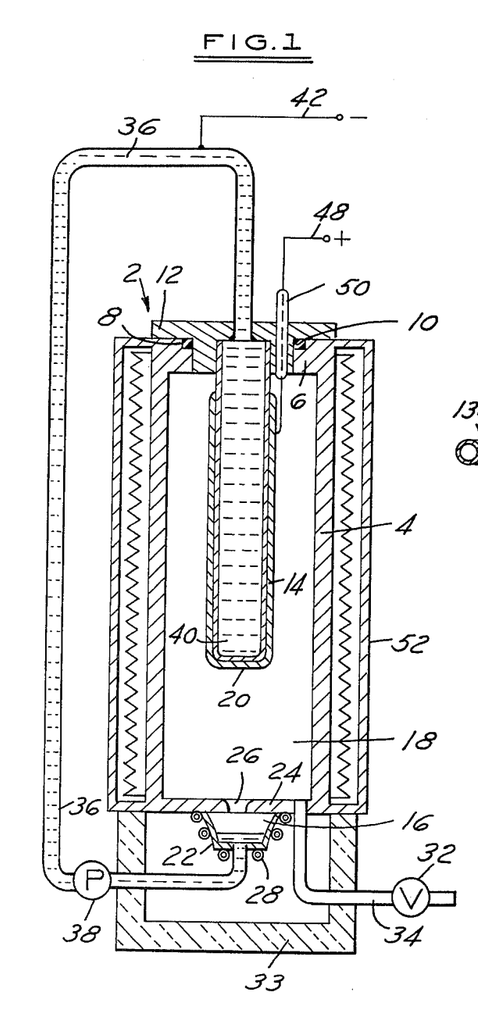
FIG. 1 is a schematic vertical cross section of one embodiment of a thermoelectric generator illustrating this invention.

This invention may be best understood by first referring to FIG. 1 wherein an alkali metal thermoelectric generator is illustrated in vertical cross section generally indicated at 2. The device in FIG. 1 is housed in chemically resistant vessel 4, e.g. stainless steel. Vessel or tube 4 has flange 6 at one end. Flange 6 is provided with groove in which rests soft metal O-ring seal 10 which provides an essentially vacuum tight seal when cover plate 12, which is formed of chemically resistant material, is secured to tube 4 by thread or bolt or other conventional means, not shown. Positioned inside tube 4 and fitting tightly into a recess of plate 12 is smaller tube 14. Tube 14 may additionally be held to cover plate 12 by hooks (not shown) to provide additional attachment to cover plate 12. Tube 14 is formed, for example, of cationically conductive electrolyte solid such as an alkali metal beta-alumina of well known composition for these devices. (See, for example, U.S. Pat. Nos. 3,404,036; 3,533,848 and 3,535,163). The lower end of tube 14 including sides and bottom is provided with a thin conductor 20 (somewhat enlarged in thickness in the drawing) which is porous enough to permit the working fluid (e.g., alkali metal) to pass through but sufficiently thick to conduct electricity. Such porous electrodes may be made as in U.S. application Ser. No. 614,289, filed Sept. 17, 1975 by Saillant and Weber which is hereby incorporated by reference.

Near the lower end of vessel 4 is pressure zone separator 24 (made of stainless steel or other chemically resistant materials) which permits discharge of alkali metal through orifice 26 but which maintains a pressure difference between furnace zone 18 and collection zone 16. After passage through orifice 26, alkali metal vapor is collected e.g., as a liquid, in condenser trough 22. Condenser trough 22 is welded to separator 24 and is cooled by heat exchange pipes 28. From condenser trough 22 alkali metal passes through conduit 36 by means of pump 38 (mechanical or electromagnetic) into tube 14.

Heater 52 is disposed about vessel 4 and cover plate 12 but may be also in tube 14. Heater 52 is shown as an electrical device but may also be in the form of heat jacket with molten fluid surrounding tube 4. Heater 52 maintains furnace zone 18 and walls thereof essentially isothermal.

Tube 14 is shown in FIG. 1 as filled with molten (e.g., liquid) alkali metal 40 from conduit 36. Positive lead 48 extends from porous electrode 20 through insulator 50 in cover plate 12.

In operation of the device, heat is converted directly to electrical energy. Tube 4 is evacuated by suitable evacuation means such as an evacuation pump (not shown) and then conduit 34 is sealed at valve 32. The alkali metal 40, in tube 14, heated by heater 52 to a temperature of about 300°–800° C. or higher, attains a vapor pressure higher than the controlled pressure in furnace zone 18. This difference in pressure creates an electrical potential across electrolyte tube 14. Alkali metal passes through tube 14 in cationic form with loss of electrons to the external circuit through negative terminal 42. Electrons return through positive lead 48 to conductor 20 where they recombine with the cations of the alkali metal passing through electrolyte 14. The fit between the end of tube 14 and the recess in cover plate 12 needs only to be tight enough so that the leakage of alkali metal past its mating surfaces is small compared to the total current of alkali metal ions through the wall of tube 14.

Neutral alkali metal evaporates from porous electrode 20 and creates a vapor pressure in furnace zone 18. By varying, for example, the load of the external circuit to encourage electron flow and resultant formation of alkali metal vapor, vapor pressure is built up in furnace zone 18. As the pressure builds up in furnace zone 18 hydrodynamic flow of vapor begins out orifice 26 and into condenser trough 22, cooled by heat exchanger 28. For alkali metal such as sodium, suitable pressure in the furnace zone 18 is reached in the vicinity of about one Torr for desirable flow of the alkali metal vapor. The pressure in collection zone 16 is to be maintained at about one half, or less, of the pressure in zone 18 by adjustment of the temperature of condenser cup or trough 22.

Condenser trough or cup 22 may have temperature control by exposure to ambient temperature but preferably is controlled by heat exchanger pipes 28. The alkali metal vapor condensed in condenser trough 22 is returned to tube 14, by means of pump 38 and conduit 36. Conduit 36 is preferably of capillary dimensions, in order to reduce heat conduction losses. Furnace zone 18 is maintained at a temperature at least 100° C in excess of the condenser trough 22 temperature.

The alkali metal is thus discharged from furnace zone 18 to cooling zone 16 through orifice 26 in such a way that the electrical energy associated with the alkali metal flowing out the orifice is large in comparison to the radiative heat loss out of orifice 26.

Figure 2:
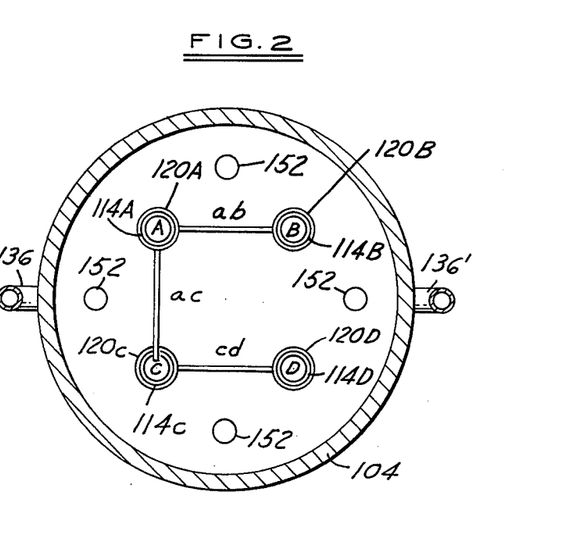
FIG. 2 is a schematic horizontal cross section of another embodiment of this invention illustrating a concentric device with four high pressure regions each surrounded by electrolyte solid.

FIG. 2 illustrates in horizontal cross sectional view a second embodiment of this invention. Cylindrical vessel 104, made of chemically resistant material, e.g. stainless steel encased in mineral insulation (not shown), surrounds high pressure zones A, B, C and D and immersion heaters 152.

High pressure regions, A, B, C and D are surrounded by cylindrical tubes 114A, B etc. of electrolyte solid having liquid alkali metal therein, each individually corresponding in general to tube 14 with alkali metal therein, of the device in FIG. 1. In electrical contact with tubes 114A, 114B, etc. are respective porous electrode elements 120A, B etc., also individually corresponding in general to the porous electrode element 20 of the device of FIG. 1.

Immersion heaters 152 extend beyond the length of tubes 114A, B, etc. (see FIG. 3) and provide heat energy for the device. The immersion heaters in this embodiment are close ended heat pipes and extend from a common heat source, e.g., a target of heliostats, not shown.

Immersion heaters 152 can also be open ended pipes whereby a continuous flow of heat transfer fluid (e.g., sodium) enters and exists at opposite ends of the device. In such case, the collection zone is advantageously to be spaced about the circumference of cylindrical tube 104.

Conduits 136 and 136[1] carry alkali metal from the condensers to the high pressure zones A and B, and C and D, respectively. (They are more clearly illustrated in FIG. 3).

Electrical connection within the device of FIG. 2 is illustrated by bus bar conductors ab and cd (made of suitable conducting material, e.g. copper clad with an alkali-metal-resistant coating) which extend, respectively, between porous electrode elements 120A and 120B and 120C and 120D in FIG. 2. Bus bar conductor ac extends between porous electrode 120A and liquid alkali metal within high pressure zone C.

The series electrical connection with bus bar ac in this device is to reduce conductive losses as compared to an arrangement wherein all the alkali metal in high pressure zones is in parallel electrical connection. The devices of this invention may include parallel or series electrical connection or the combination thereof as illustrated in FIGS. 2 and 3.

Figure 3:
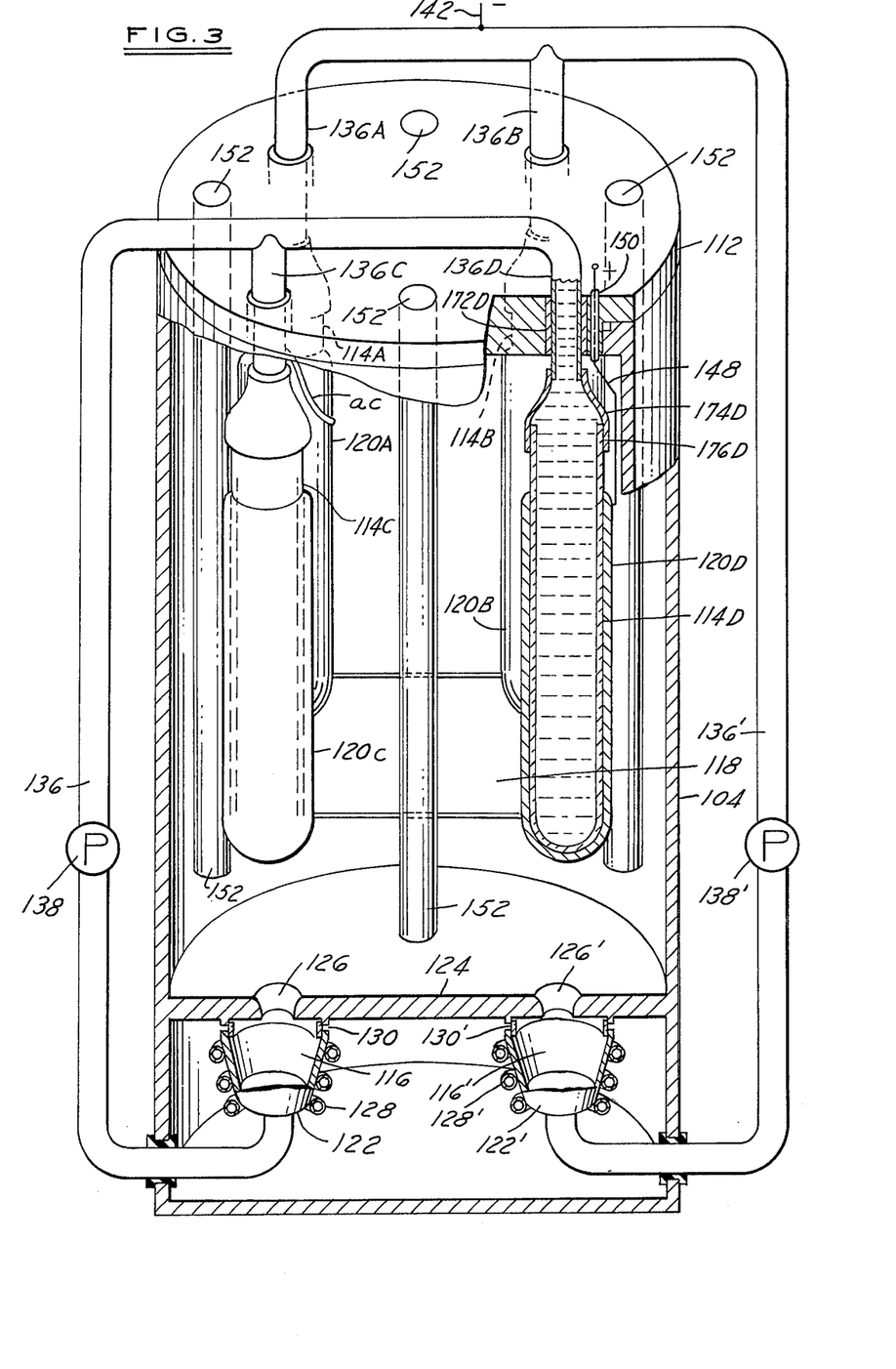
FIG. 3 is a schematic vertical three-quarter cross section of the embodiment of FIG. 2 with sectional view of one of the high pressure zones.

The embodiment of FIG. 2 may be better understood by reference to FIG. 3 wherein it is shown in a three quarter vertical cross section view with a section view of high pressure zone D.

In FIG. 3, the sectional view of high pressure zone D shows in greater detail the passageway for alkali metal into tube 114D. Tube 114D is filled with liquid alkali metal as are tubes 114A, 114B and 114C.

Liquid alkali metal, collected in condenser 122, passes by means of electromagnetic pump 138 through capillary conduit 136 having branch capillary conduits 136C and 136D. Capillary conduits 136 and 136[1] are shown electrically insulated from the bottom of vessel 104 in FIG. 3. As shown more plainly in the sectional view comprising high pressure zone D, branch conduit 136D (as are the other branch conduits) is electrically insulated from cover 112 by insulator 172D which extends through cover plate 112. Branch 136D (as are the other branch conduits) is sealed to tube 114D by means of metal to ceramic seal comprising suitable metal, e.g. tantalum or molybdenum sleeve 174D brazed with nickel-titanium alloy 176D. The tantalum sleeve is machined for very close fitting with tube 114D such that about a 1:1 gram atom ratio Ni-Ti brazing alloy, using standard "active metal" brazing techniques, provides the necessary high temperature ceramic to metal seal. Care should be taken so that the edge of the sleeve 174D is at a distance from the edge of porous electrode 120D to prevent undesired leakage of charge along tube 114D, between 174D and 120D.

Bus bar 148 extends from porous electrode 114D through insulator 150 in cover 112 to the external circuit, not shown. Negative terminal 142 extends from alkali metal within conduit branch 136A to the external circuit.

Bus bar strap ac extends between porous electrode 120A and branch conduit 136C and provides an electrical connection which is essentially isothermal within furnace zone 118.

In operation, furnace zone 118 and collection zones 116 and 116[1] are first evacuated to below 0.1 Torr, preferably 0.001 Torr by means of a vacuum pump, not shown. Immersion heaters 152 then heat in furnace zone 118 to operating temperatures e.g. at least 300° C, and advantageously 800° C or higher. By varying the external circuit load, suitable pressure builds in furnace zone 118 as the alkali metal evaporates from the porous electrodes. This pressure should be normally at least about 0.5 Torr but may be 100 Torr or higher, e.g. between about 1–20 Torr, desirably about 1–5 Torr.

Alkali metal vapor flows hydrodynamically through orifices 126 and 126[1] and is collected in condensers 122 and 122[1]. Condensers 122, and 122[1] are in contact with separate heat exchangers 128 and 128[1] respectively which cool the alkali metal vapor. Condensers 122 and 122[1] are insulated from and sealed to plate 124 via the double metal-to-ceramic seals 130 and 130[1]. By maintaining a condenser temperature such that pressure in collection zone 116 is about one-half the pressure in furnace zone 118, desirable flow of alkali metal through orifices 126 and 126[1] is achieved.

Figure 4:
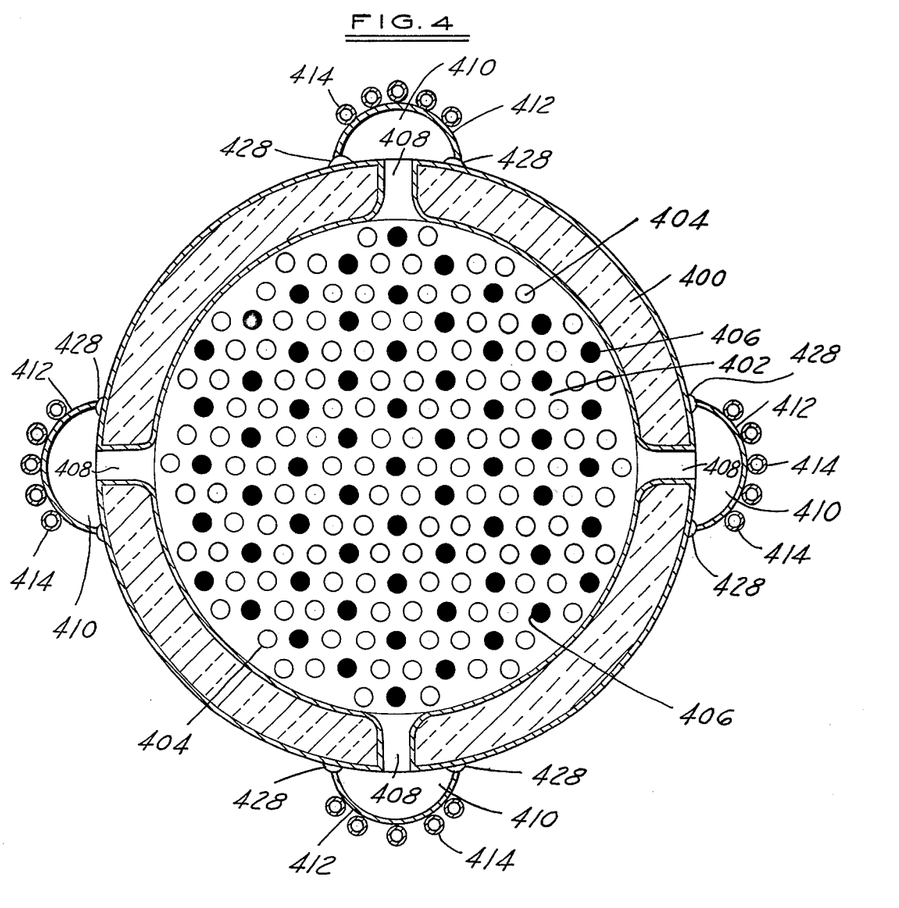
FIG. 4 is a schematic horizontal cross section of another embodiment of this invention illustrating many high pressure regions and immersion heating elements in a concentric device.

Still another embodiment of this invention is illustrated in horizontal cross section in FIG. 4. A cylindrical vacuum tight, heat insulating, furnace wall 400 (made of mineral fiber encased by stainless steel) surrounds furnace zone 402. Furnace zone 402 is packed with parallel banks of beta-alumina tubes 404, as previously described, containing alkali metal therein. Interspersed with the beta-alumina tubes are immersion heaters 406. Immersion heaters 406 and beta-alumina tubes 404 are arranged in furnace zone 402 so that the centers of three adjacent ones can be said to be at corners of an equilateral triangle. There is one immersion heater for each two beta-alumina tubes. All beta-alumina tubes and immersion heaters are cylindrical and of equal diameter and the spacing between them is equal to the radius of the beta-alumina tubes (or immersion heater pipes), i.e. center to center spacing equals three beta-alumina (or immersion heater) radii.

Furnace wall 400 has four shaped, slit-like openings 408 therein which lead to collection zones 410, comprising condensers 412 and condenser cooling pipes 414. The condensers 412 may be electrically insulated from furnace wall 400 by suitable, gas tight metal-glass-metal or metal-ceramic-metal seals, schematically indicated at positions 428.

The embodiment of FIG. 4 has many similarities to that of FIGS. 2 and 3. Each electrolyte solid surrounding a high pressure zone is a beta-alumina tube closed at one end. At the other end it is sealed to a branch conduit, as previously described, which supplies alkali metal. The branch conduit is sealed to the beta-alumina tube by a suitable metal-ceramic seal. Most of the outside of the beta-alumina tube is covered with a porous electrode. The metal-ceramic seal is within the isothermal furnace zone. This permits the existence of isothermal bus bars for electrical series connections, such bus bars being attached to the porous electrode (i.e. the positive side) of one tube, and to the branch conduit, hence the liquid sodium (i.e. the negative side) of another tube.

The chief differences of the embodiment indicated in FIG. 4 from that of FIGS. 2 and 3 are twofold: 1. There are many well-packed beta-alumina tubes, which lead to (a) a high power density, and (b) a low surface-to-volume ratio of the furnace zone, hence relatively low heat conduction losses. 2. The openings through which alkali metal vapor flows from the furnace zone to the condensers are in the cylindrical enclosure of the furnace zone, and are in the shape of long slits, parallel to, and of essentially the same length as the beta-alumina tubes.

The height of this embodiment of the invention, i.e. the dimension perpendicular to the plane of FIG. 4, is 2 feet, but may be in the range of up to several feet. Optimum lengths are a function of: 1. The maximum length of suitable electrolyte (e.g., beta-alumina) tubes which can be made. 2. The axial electrical resistance of porous electrode elements, on the outside of such ceramic tubes. 3. The axial electrical resistance of the column of alkali metal inside the tubes. The significance of consideration 2 is minimized by furnishing the porous electrodes with thickened ribs as is commonly done in fuel cells or photovoltaic cells. Furthermore, the current may be tapped off at intervals along the length of the porous electrodes. The significance of consideration 3, which is least important for current beta-alumina tube lengths becomes increasingly important as tube lengths are made beyond a few feet.

In a typical operation, using sodium as the working fluid and a furnace temperature of 800° C, the vapor pressure of the liquid sodium within the beta alumina tubes is about 334 Torr. The pressure in the furnace zone is desirably controlled to be near a value of below about 10 Torr, e.g. about one Torr. The difference in pressure across the walls of the solid electrolyte (i.e. the beta-alumina tubes) provides the driving force for the migration of sodium ions through the beta-alumina electrolyte.

Optimum operating pressures in the furnace zone 402 are arrived at by balancing the need for a low pressure, leading to a high voltage output, against the need for a sufficiently high pressure, to produce a fast hydrodynamic flow out of the furnace wall openings, such that the former pressure is made small while radiation losses are made virtually negligible. The control of this furnace pressure is effected by controlling the current drawn by the external electrical load, and hence controlling the rate of production of sodium vapor at the porous electrodes. Alternatively, one could achieve further control by means of slide adjustments (not shown in FIG. 4) of the area of the slit openings 408.

Alkali metal (e.g., sodium) vapor is produced throughout furnace zone 402 of the embodiment of FIG. 4. The vapor has to flow from the center portions of the furnace zone 402 to the furnace wall 400, and thence out of the openings 408. This radial flow leads to a frictional radial pressure gradient. Thus, voltage derived from near the center of the furnace is somewhat lower than near the periphery. Selection of a practical limit on the value of this pressure gradient leads to a desired maximum radius of the furnace in the embodiment under discussion.

Fastest flow of alkali metal vapor out of the openings 408 is flow at sonic velocities. This is achieved when the pressure in the collection zones 410 is about one half (or less) of the pressure on the furnace side. For example, if the latter stands at one Torr, then the pressure in the collection zones is desirably maintained at about ½ Torr. This maintained pressure corresponds, for example, to the vapor pressure of sodium at 414° C. The condensers 412 are cooled to that temperature (or lower) by means of cooling pipes 414. This temperature is, in effect, the "cold", or "heat sink" temperature of the device. Such high heat sink temperatures provide devices which can be used as "topping" generators. Waste heat, at about 400° C, may be used to operate a "bottom" thermoelectric generator (or steam turbine, etc.), operating between about 400° C and ambient temperatures.

The sodium vapor flows out of openings 408 and condenses on the cooler walls of condensers 412. Liquid sodium drains down the walls of condensers 412, and is collected and conducted to pumps, which return it to the interior of the beta-alumina tubes via suitable conduits and distribution manifolds. These plumbing features are not shown in FIG. 4 as they are essentially like the ones of the embodiment of FIGS. 2 and 3, and are amply illustrated in those figures.

Advantageously, the embodiment depicted in FIG. 4 lends itself well to a combination series — parallel electrical hookup, with four stages of series connection. Each electrically insulated condenser drains liquid alkali metal into its own collection conduit, thence to its own pump, and from there to its own redistribution manifold. The four pumps and redistribution manifolds will, of course, be insulated from each other. The beta-alumina tubes are seen as divided into four groups of equal numbers of tubes, each group being electrically in series with the next group. Within a group, electrical conductors connect the electrode elements in contact with the tubes therein and alkali metal within the tubes of the group is all in electrical contact such that there is parallel connection for such group. The details of accomplishing this are readily apparent from the methods described in connection with the device of FIGS. 2 and 3.

An optimal division for series connection of the groups of beta-alumina tubes of the device of FIG. 4 is to make the groups radially concentric. This is because of the small pressure and concentration gradient of the alkali metal vapor and the consequently inverse gradient in voltage output, mentioned. This will lead to parallel connections between elementary cells of the most nearly equal voltage output.

It should be noted that it is not necessary to have one separate orifice for each separate stage of electrical series connection. It is possible to have one orifice serve separate, mutually insulated sections of a condenser.

It is very easy, of course, to connect all cells in parallel. The various condensers (if there are more than one) then need not be insulated from the furnace wall by metalceramic-metal seals. A single collection manifold, pump, and distribution manifold will serve. However, this mechanical simplification leads to a reduction in thermal efficiency due to certain irreducable bus bar conduction losses.

EXAMPLE:

The device of FIG. 4 is designed according to the following calculations. The tubes are constructed of sodium beta-alumina as herebefore described and well known in this art.

Table 1 defines all notation and all units to be used in these calculations. All calculations are made for a furnace zone temperature of 800° C (1073° K). The calculations are easily extended to other temperatures.

A. Ideal Efficiency for the thermoelectric generator of FIG. 4 in the absence of heat conduction or radiation losses, is given by (1) below:

$$\eta = \frac{Vi/4.18 - Zi^2/4.18}{Vi/4.18 - Zi^2/4.18 + (i/F) L + (i/F) C_p \Delta T} \quad (1)$$

Each term in equation (1) has the dimensions of calories/sec./(cm² of beta-alumina). The numerator represents the electrical energy yielded by the device. V is the open circuit voltage; Z is the total impedance, per cm² of beta alumina, i.e. the sum of the ohmic resistance plus all other sources of polarization. It presently stands at about 0.4 ohm-cm² for tubes of 1 mm. wall thickness and is not a strong function of temperature or current density. (The small amount of electrical power used by the liquid sodium pump is ignored. This power has been found to be negligible). The denominator of equation (1) has the electrical energy taken out, plus the extra heat which must be taken out concomitantly. L, the heat of vaporization of liquid sodium, is taken to be 23,498 cal./mole at 1073 K. The last term in the denominator is heat absorbed, per mole of liquid sodium at the condenser temperature, as it is pumped back into the high pressure regions. $C_p$ is taken as about 7 cal./mole.

The EMF or open circuit voltage, is given by a Nernst equation (2):

$$V = \frac{4.18\, RT}{F} \ln p_o/p \quad (2)$$

wherein Po is the vapor pressure of sodium at temperature T, given by equation (3):

$$\ln p_o = -12423/T + 17.391 \quad (3)$$

T, i and p are independent variables. The condenser temperature, (i.e. lowest temperature in the cooling zone), is obtained by re-application of equation (3), being the temperature at which the vapor pressure of sodium is $p/2$ (maximum mass flow of sodium will occur at a pressure in collection zone which is about one-half the pressure in the furnace zone) giving equation (4):

$$T_c = \frac{12423}{17.39 - \ln p/2} = \frac{12423}{18.083 - \ln p} \quad (4)$$

Combining (1), (2) and (4), $$\eta(T, i, p) = \frac{(RT/F) \ln p_o/p - Zi/4.18}{(RT/F) \ln p_o/p - Zi/4.18 + (L/F) + \left(\frac{C_p}{F}\right)\left[T - \frac{12423}{18.083 - \ln p}\right]} \quad (5)$$

Considering T=1073K, from (3) it is obtained $\ln p_o = 5.813$. Substituting this and all other previously quoted values into equation (5) and dividing through by (RT/F) gives equation (6).

$$\eta(1073, i, p) = \frac{5.812 - \ln p - 4.331 i}{20.356 - \ln p - 4.331 i - \frac{40.787}{18.083 - \ln p}} \quad (6)$$

The output voltage, under current flow, is:

$$V = 0.537 - 0.09235 \ln p - 0.4 i \quad (7)$$

Some numerical values of V, η, and Tc at various values of p and i, are given in Table 2.

B. Radiation Losses.

According to standard texts on fluid flow, the flow velocity through an opening will be sonic if the pressure on the low pressure side is less than or equal to $$\left(\frac{2}{\gamma+1}\right)^{\frac{\gamma}{\gamma+1}}$$

times that on the high pressure side. Cp/Cv = 1.667 for a monatomic gas. The pressure ratio for sonic flow is, therefore, 0.49.

According to standard texts, sonic velocity is:

(8) $C = (\gamma p'/\rho)^{1/2} = 2454\, T^{1/2}$ cm/sec, for Na vapor.

Per cm² of opening, the flow, in moles Na/cm²-sec, is:

(9) $f = \rho/M \times 2454\, T^{1/2} = 3.983 \times 10^{-2}\, p/T^{1/2}$

Choosing operation, for example, at one Torr on the high pressure side of an opening, at 1073K, a voltage of 0.443V per tube, with a condenser temperature of 687K, and an ideal efficiency of 0.28 (this combination being an entry in Table 2), then $f = 1.216 \times 10^{-3}$, which corresponds to a current of 117 amperes per cm² of opening area, and a power output of $0.443 \times 117 = 52.0$ watts per cm² of opening area. Black body radiation losses between 1073K and 687K are a maximum of $5.67 \times 10^{-12} \times (1073^4 - 687^4) = 6.25$ watts/cm². Operating at an ideal efficiency of 28%, the heat input is 51.4/0.28 = 185.7 watts per cm² of opening area. The radiation losses will therefore lower the efficiency to $185.7/(185.7+6.25) \times 28 = 27\%$, at the most.

The actual radiation loss will be smaller than calculated, due to (a) the finite length of the opening equal to the thickness of the furnace insulation, and (b) the reflectivity of the condenser.

As can be seen, radiation losses are almost negligible in the devices of this invention according to these calculations.

Heat Conduction Losses

Before estimating heat conduction losses, a maximum furnace diameter should be established. From FIG. 4, it is clear that there must be a pressure drop between the center and the cylindrical wall of the furnace, to propel the sodium vapor, produced all through the furnace at porous electrode elements, outward toward the openings in the furnace wall.

For the purpose of this calculation, the equilateral triangle array of FIG. 4 is assumed. The radius of each tube is taken to be a conventional 0.25 cm. and neighboring tubes are separated by 0.75 cm, center to center, and there is one immersion heating tube for each two beta-alumina tubes with the same radius of 0.25 cm. A pressure drop of 0.5 torr can be tolerated from the 1.5 Torr at the center of the furnace to the 1.0 Torr at the periphery of the furnace. This will reduce the voltage output of the innermost tubes by only 0.037 volts, according to equation (7).

According to a standard text, the following formulae (from Bergelin, et. al.) shows the pressure drop per row of tubes, in laminar fluid flow across a bank of tubes, under isothermal conditions:

$$\Delta p = \frac{280}{(N_{Re})_v} \left(\frac{D_t}{P}\right) 1.6 \left(\frac{\rho V_{max}^2}{2 g_c}\right) \frac{\text{lb. force}}{\text{ft.}^2} \quad (10)$$

wherein $(N_{Re})_v$ is modified Reynold's number, which turns out to be about 10, i.e. well in the laminar flow region and $$(N_{Re})_v = D_v V_{max} \rho/\mu \quad (11)$$

where the hydraulic radius $D_v$ is given by $$D_v = \frac{4 \times (\text{free bundle volume})}{(\text{exposed surface area of tubes})} \quad (12)$$

$\rho$ is the density, $\mu$ the viscosity and $V_{max}$ the maximum velocity of sodium vapor. In the equation (10) $D_t$ is the tube diameter and P the pitch, equal to the center-to-center tube spacing, in the triangular arrangement of beta-alumina and heat immersion tubes.

The parameter $\beta = P/D_t (= 1.5$ for chosen values) is defined. It can be shown (by a crystallographic unit cell type of argument) that for the device of FIG. 4, $D_v$ is as equation (13) below:

$$D_v = \frac{4(10.39\beta^2 r^2 - 3\pi r^2)}{3 \times 2\pi r} = (2.205 \beta^2 - 2) r = 0.74 \text{ cm} \quad (13)$$

With a change of dimensions, equation (10) becomes equation ($10^1$)

$$\Delta p = 0.210\beta^{-1.6} \rho V^2_{max}/2 \, (N_{Re})_v \text{ Torr} \quad (10)$$

$$\Delta p = 0.105\beta^{-1.6} V_{max}\mu/(2.205 \beta^2 - 2) r \text{ Torr} \quad (14)$$

The viscosity $\mu$ of sodium vapor at 1073K is taken to be $1.8 \times 10^{-4}$ poise. $V_{max}$ is the velocity of sodium vapor through the gaps between tubes. It will increase as a function of the radial coordinate $\overline{R}$, the cross sectional distance from the center of the furnace, because sodium vapor is produced all through the furnace. $V_{max}$ will now be calculated.

In the device of FIG. 4, the number of beta alumina tubes/cm² of cross section is $0.1925/\beta^2 r^2$. Hence, the number of tubes within a radius $\overline{R}$ is $0.1925 \, \pi\overline{R}^2/\beta^2 r^2 = 0.605 \, \overline{R}^2/\beta^2 r^2$. Per unit length, these tubes will have a total surface area of $3.80 \, \overline{R}^2/\beta^2 r$. In consistency with the example of section B, the current density is taken to be 0.24 amps./cm² of beta-alumina. Within a radius $\overline{R}$, therefore, $9.45 \times 10^{-6} \overline{R}^2/\beta^2 r$ moles of sodium vapor are produced per cm length of furnace. This vapor flows outward through an area of approximately $2\pi \overline{R} (1 - \beta^{-1})$, the open area between tubes. It follows that $V_{max}(\overline{R}) \times \rho(\overline{R})/23 = 1.504 \times 10^{-6}\overline{R}/(1-\beta^{-1})\beta^2 r$ moles/cm²-sec, where $\rho(\overline{R})/23 = p(\overline{R})/6.23 \times 10^4 T$ according to the ideal gas law. Hence, $$V_{max}(\overline{R}) = 9.373 \times 10^{-2} T \, \overline{R}/\beta^2 r \, p(\overline{R}) (1-\beta^{-1}) \quad (15)$$

$$\Delta p = - \frac{0.984 \times 10^{-2} \beta^{-1.6} \mu T \overline{R}}{(2.205 \beta^2 - 2) \beta^2 (1 - \beta^{-1}) r^2 p(\overline{R})} \quad (16)$$

The number of rows of tubes, per unit length, is about $0.577/\beta r$ and inserting this, plus the values $T = 1073$ and $\mu = 1.8 \times 10^{-4}$, equation (16) shows $$P(\overline{R}) dp = - \frac{1.10 \times 10^{-3} \overline{R} d \overline{R}}{(2.205 \beta^2 - 2)\beta^{4.6}(1 - \beta^{-1}) r^3} \quad (16^1)$$

Integrating ($16^1$) from $\overline{R} = 0, p = 1.5$ to $\overline{R} = R_f, p = 1.0$ permits solution for the furnace radius $R_f$. (The integration is not expected to lead to great errors.) Thus, $$p^2 = 2.25 - \frac{1.10 \times 10^{-3} \overline{R}^2}{(2.205 \beta^2 - 2) \beta^{4.6} r^3 (1 - \beta^{-1})} \quad (17)$$

$$1 = 2.25 - \frac{1.10 \times 10^{-3} R_f^2}{(2.205 \beta^2 - 2) \beta^{4.6} r^3 (1 - \beta^{-1})} \quad (17^1)$$

Substituting the chosen values of $\beta = 1.5$, and $r = 0.25$ into ($17^1$) yields $R_f = 10.65$ cm for the inside radius of the furnace. This will accommodate about 490 beta-alumina tubes, with an electrical output of 81 watts per cm of furnace length, for chosen parameters.

As before, $9.45 \times 10^{-6} R^{-2}/\beta^2 r$ moles of sodium vapor per second are produced per centimeter length of the furnace. For $R = 10.65$ cm, $\beta = 1.5$, and $r = 0.25$ cm, then it is seen that there are $1.905 \times 10^{-3}$ moles/cm-sec. From equation (9), the sonic flow out of a nozzle is $3.983 \times 10^{-2} p/T^{1/2} = 1.216 \times 10^{-3}$ moles/cm²-sec at one torr and 1073K. Thus, dividing moles produced per length per sec by moles which will flow per area of opening, a value of 1.57 cm of circumferential distance is obtained and therefore each opening in FIG. 4 is about 0.4 cm wide.

With a mineral felt insulation which is 5 cm thick and has a mean thermal conductivity, over the temperature range, of $1.44 \times 10^{-3}$ watts/cm (° C), and a temperature drop of 775° C, the resulting heat loss is 18.4 watts per cm of furnace length. At an initial efficiency of 27% (see section B), the heat input, per cm of furnace length, must be $81/0.27 = 300$ watts, to which the conduction loss of 18.4 watt must now be added. This will degrade the thermal efficiency from 27% to 25.4%. The end face losses have been ignored here, because they depend inversely on the length of the furnace, and can be made negligible in principle.

D. Bus Bar Losses

For low voltages, high currents, the heat conduction losses down the electrical bus bars can be considerable. If these conductors are given too large a length: cross section ratio, the electrical resistance losses will become large. There will always exist an optimized length-to-area ratio, and an irreducible loss associated with it. The bus bar losses can be made small, if the voltage can be raised by series electrical connection. A few stages of series connection is seen to suffice.

The efficiency fraction can be shown to be $$\eta = \frac{nV - 2(\sigma y)^{-1}}{nV/\eta_i - (\sigma y) + \kappa \Delta T_B y} \quad (18)$$

where $y = \frac{\text{cross sectional area of a bus bar}}{(\text{length of bus bar}) \times (\text{current in bus bar})}$ The calculation is made for two bus bars, one positive, one negative. $\eta_i$ is the efficiency in the absence of bus bar losses, and n are the number of stages of electrical series connections. V is the voltage per element, $\sigma$ and $\kappa$ are the electrical and thermal conductivities, respectively, of the bus bars, and $\Delta t$ is the temperature drop along the bus bars. For optimization, Y must be the positive root of the equation.

$$y^2 - (4/n\sigma V)y + (1 - 2\eta_i^{-1})/(2\sigma\kappa\Delta T) = 0 \quad (19)$$

For the values in Table 3, it is taken that $V = 0.44$ volts, $\sigma = 2.14 \times 10^5$ ohm$^{-1}$ $-$cm$^{-1}$ $\eta_i = 0.25$, $k = 3.7$ watts/cm$-$(°C), and $\Delta T = 775$°C. These values correspond to the properties of copper, and are otherwise consistent with previously selected parameters. An all parallel connection leads to n = 1. Where n = 2, there is one series connection.

It is seen in Table 3 that the all-parallel connection suffers a significant degradation of efficiency, from 25% to 15%. With three stages series connection, the efficiency is improved to 22%. Beyond this, one tends to run into diminishing returns. By n stages, it is that the beta-alumina tubes are divided into n bundles of equal numbers; the tubes within a bundle are connected in parallel, and the separate bundles are connected in series. The imaginary dividing surfaces between bundles should be as much concentric cylindrical surfaces as possible. Such a scheme would best cope with the slightly changing voltage, per tube, as a function of the coordinate $\bar{R}$.

E. Power Density

In section C, a calculation of 81 watts electrical output per cm of furnace length, for a furnace diameter, including insulation, of 31.3 cm. This calculates to 105 kilowatts/cubic meter. This figure does not include the volume taken up by the condensers, pumps, and recirculation pipes. An overall power density in excess of 50 KW/cubic meter approaching 100 KW/cubic meter is seen to be feasible.

TABLE 1:

NOTATION

| Symbol | Description | Units |
|---|---|---|
| C | Velocity of sound | cm sec$^{-1}$ |
| $C_p$ | Heat capacity of liquid sodium | cal.-Mole$^{-1}$ $-$deg. C$^{-1}$ |
| $D_t$ | Diameter of $\beta$-alumina tubes | cm |
| $D_v$ | Hydraulic Radius | cm |
| f | Molar flow (of Na vapor out of orifice) | moles-cm$^{-2}$ $-$sec$^{-1}$ |
| F | The Faraday (= 96500) | coulomb-mole$^{-1}$ |
| $g_c$ | gravitational constant (=32.17) | ft-sec$^{-2}$ |
| i | current density (in beta-alumina) | ampere - cm$^{-2}$ |
| L | Heat of vaporization | cal.-mole$^{-1}$ |
| M | Molecular weight (of Na; = 23) | gram-mole$^{-1}$ |
| $(N_{Re})_v$ | Modified Reynolds number | dimensionless |
| p | pressure of Na vapor in furnace | Torr |
| po | vapor pressure of Na | Torr |
| p' | pressure | dyne-cm$^{-2}$ |
| P | Pitch, a tube spacing dimension | cm |
| r | radius of a $\beta$-alumina tube | cm |
| R | Gas constant | 1.987 cal. (° C)$^{-1}$ mol$^{-1}$ |
| $\bar{R}$ | Radial coordinate in furnace | cm |
| $R_f$ | Inside radius of furnace | cm |
| T | furnace (i.e. high) temp. of engine | ° K |
| $T_{cond}$ | Condenser (i.e., low) temperature | ° K |
| $\Delta T$ | = T − $T_{cond}$ | ° K |
| $\Delta T_B$ | = T − $T_{ambient}$ | ° K |
| V | Voltage output (per element) | volts |
| $V_{max}$ | Velocity of Na vapor in furnace | cm - sec$^{-1}$ |
| y | area/length/current, in bus bar | cm-ampere$^{-1}$ |
| Z | ohmic plus polar'n. impedance of $\beta$-alumina tube walls | ohm cm$^2$ |
| $\beta$ | P/D$_t$ | dimensionless |
| $\gamma$ | $C_p/C_v$(for Na vapor; = 1.667) | dimensionless |
| $\eta$ | efficiency fraction | dimensionless |
| $\kappa$ | Thermal conductivity (bus bar) | watt-cm$^{-1}$-(° C)$^{-1}$ |
| $\mu$ | viscosity of Na vapor | poise |
| $\rho$ | Density of Na vapor | gram - cm$^{-3}$ |
| $\sigma$ | electrical conductivity (bus bar) | ohm$^{-1}$ - cm$^{-1}$ |

TABLE 2:

| COMPUTATIONS FOR T−1073K | | | | | |
|---|---|---|---|---|---|
| P (Torr) | i (amp. cm$^{-2}$) | V volts | Watts/ cm$^2$ ceramic | efficiency fraction* | Tcond. ° K |
| 0.5 | 0 | 0.604 | 0 | 0.345 | 662 |
| 0.5 | .04 | .588 | .024 | 0.339 | 662 |
| 0.5 | .08 | .572 | .046 | 0.332 | 662 |
| 0.5 | .16 | .540 | .086 | 0.320 | 662 |
| 0.5 | .24 | .508 | .122 | 0.306 | 662 |
| 0.5 | .32 | .476 | .152 | 0.293 | 662 |
| 0.5 | .40 | .444 | .177 | 0.278 | 662 |
| 0.5 | 0.48 | .412 | .198 | 0.264 | 662 |
| 0.5 | 0.56 | .380 | .213 | 0.248 | 662 |
| 1.0 | 0 | .539 | 0 | 0.321 | 687 |
| 1.0 | 0.04 | .523 | .021 | 0.315 | 687 |
| 1.0 | .08 | .507 | .041 | .308 | 687 |
| 1.0 | .16 | .475 | .076 | .294 | 687 |
| 1.0 | .24 | .443 | .106 | .280 | 687 |
| 1.0 | .32 | .411 | .132 | .265 | 687 |
| 1.0 | 0.40 | .379 | .152 | .249 | 687 |
| 2.0 | 0 | .475 | 0 | .300 | 714 |
| 2.0 | .03 | .453 | .014 | .290 | 714 |
| 2.0 | .06 | .451 | .027 | .285 | 714 |
| 2.0 | .12 | .427 | .051 | .274 | 714 |
| 2.0 | .18 | .403 | .073 | .262 | 714 |
| 2.0 | .24 | .379 | .091 | .251 | 714 |
| 2.0 | .30 | .355 | .106 | .238 | 714 |
| 3.0 | 0 | .437 | 0 | .280 | 731 |
| 3.0 | 0.12 | .389 | .047 | .257 | 731 |
| 3.0 | 0.24 | .341 | .082 | .232 | 731 |
| 3.0 | 0.36 | .293 | .106 | .206 | 731 |
| 4.0 | 0 | .411 | 0 | .268 | 744 |
| 4.0 | 0.12 | .363 | .044 | .244 | 744 |
| 4.0 | 0.24 | .315 | .076 | .219 | 744 |
| 4.0 | 0.36 | .267 | .096 | .192 | 744 |
| 10.0 | 0 | .314 | 0 | .227 | 787 |
| 10.0 | 0.12 | .278 | .033 | .200 | 787 |
| 10.0 | 0.24 | .230 | .055 | .171 | 787 |

*efficiencies at zero power represent a computed limiting value. Practical efficiencies are, of course, zero at zero power output.

TABLE 3

| n | y | $\eta$ |
|---|---|---|
| 1 | 9.979 × 10$^{-5}$ | 0.151 |
| 2 | 8.696 × 10$^{-5}$ | 0.195 |
| 3 | 8.300 × 10$^{-5}$ | 0.212 |
| 4 | 8.108 × 10$^{-5}$ | 0.221 |
| 10 | 7.774 × 10$^{-5}$ | 0.238 |

What is claimed is:

1. A method for converting heat energy to electrical energy with alkali metal serving as the working substance and which comprises: (1) ionizing said alkali metal to cations in a first reaction zone at one side of solid electrolyte while maintaining a temperature in said first reaction zone in a range in excess of 300° C; (2) reconverting said alkali metal cations in a second reaction zone at the other side of said solid electrolyte having porous electrode in electrical contact therewith to elemental alkali metal; (3) vaporizing said elemental alkali metal from said porous electrode to a furnace zone surrounded by a furnace wall having shaped opening means therein; (4) discharging from said furnace zone through said shaped opening means alkali metal vapor to cooling means for condensing alkali metal while maintaining said cooling means at a temperature in a range at least about 100° C below the temperature in said first reaction zone and at least a major portion of said furnace wall at a temperature in a range in excess of the temperature of said cooling means.

2. The method in accordance with claim 1, wherein the alkali metal comprises sodium.

3. The method in accordance with claim 1, which comprises discharging said alkali metal vapor from said furnace zone through said shaped opening means at or near its sonic velocity.

4. The method in accordance with claim 1, which comprises maintaining said alkali vapor in said furnace zone at a pressure in a range of about 0.5–20 torr.

5. The method in accordance with claim 4 wherein the alkali metal comprises sodium and said furnace wall is maintained in a range above a temperature about 25° C below the temperature of said first reaction zone.

6. A thermoelectric generator device with one or more series electrical connections and wherein heat energy is converted directly to electrical energy, which comprises:
(1) enclosure means for a first reaction zone;
(2) enclosure means for a second reaction zone comprising a furnace wall;
(3) reaction zone separation means which:
  (a) separate and essentially complete enclosure of said first reaction zone and said second reaction zone, and
  (b) comprises at least two portions of cationically-conductive, electrolyte solids, said solids being individually essentially impermeable to elemental alkali metal and compounds thereof and ionically conductive with respect to cations of said alkali metal;
(4) alkali metal within said first reaction zone and in respective fluid communication with said portions of electrolyte solids;
(5) electrode elements within said second reaction zone and in respective electrical contact with said portions of electrolyte solids and individually sufficiently porous to permit alkali metal to pass therethrough;
(6) conduction means (I) for electron flow between
  (a) a first portion of said alkali metal which is within said first reaction zone and in fluid communication with a first of said portions of electrolyte solids, and
  (b) a first portion of said electrode elements within said second reaction zone which is in electrical contact with a second of said portions of electrolyte solids; and
conduction means (II) for electron flow between (a) a second portion of said alkali metal which is within said first reaction zone and in fluid communication with said second of said portions of electrolyte solids and (b) a second portion of said electrode elements within said second reaction zone which is in electrical contact either with said first portion of, or still another of said portions of electrolyte solids;
(7) inlet means for introducing said portions of alkali metal, electrically insulated from one another, into said first reaction zone so as to place them in respective fluid communication with said portions of electrolyte solids;
(8) temperature control means adapted to maintain a temperature in said first reaction zone in a range at least 100° C in excess of the lowest temperature in said second reaction zone and a temperature of said furnace wall in a range in excess of said lowest temperature; and
(9) means for collection within said second reaction zone of alkali metal vapor which comprises:
  (a) a furnace zone in vapor communication with said electrode elements and surrounded by said furnace wall;
  (b) cooling means for alkali metal adapted to maintain said lowest temperature;
  (c) shaped opening means in said furnace wall for discharging alkali metal vapor from said furnace zone to said cooling means.

7. The device in accordance with claim 6, wherein said shaped opening means for discharging is adapted to permit a passage at or near sonic velocity of alkali metal vapor from said furnace zone to said cooling means.

8. The device in accordance with claim 7, wherein said cooling means comprises a sufficient number of electrically insulated, one from another, cooling areas for condensing said discharged alkali metal to a liquid and its insulated return to said inlet means.

9. The device in accordance with claim 7, wherein each of said portions of electrolyte solids comprises at least one tubular member comprising one of said electrolyte solids.

10. The device in accordance with claim 9, wherein said tubular member has a tubular second member in external physical and electrical contact therewith which comprises one of said electrode elements.

11. The device in accordance with claim 10, wherein said alkali metal is sodium.

12. The device in accordance with claim 11, wherein said temperature control means is adapted to maintain said conduction means (I) essentially isothermal.

13. A thermoelectric generator device wherein heat energy is converted directly to electrical energy with alkali metal serving as a working fluid and which comprises: (1) enclosure means to a first reaction zone; (2) enclosure means for a second reaction zone comprising a furnace wall; (3) reaction zone separation means which, (a) separates and essentially completes enclosure of said first reaction zone and said second reaction zone, and (b) comprises one or more cationically-conductive, electrolyte solids, said solids essentially being impermeable to elemental alkali metal and compounds thereof and ionically conductive with respect to cations of said alkali metal; (4) alkali metal within said first reaction zone and in fluid communication with said electrolyte solids; (5) electrode elements within said second reaction zone in electrical contact with said electrolyte solids and sufficiently porous to permit alkali metal to pass therethrough; (6) conduction means for electron flow between said alkali metal within said first reaction zone and said electrode elements within said second reaction zone; (7) inlet means for introducing said alkali metal into said first reaction zone; (8) temperature control means adapted to maintain a temperature in said first reaction zone in a range of at least 100° C. in excess of the lowest temperature in said reaction zone and a temperature of said furnace wall in a range in excess of said lowest temperature; and (9) means for collection within said second reaction zone of alkali metal vapor which comprises:

(a) a furnace zone in vapor communication with said electrode elements and surrounded by said furnace wall, (b) cooling means for condensing alkali metal adapted to maintain said lowest temperature, and (c) shaped opening means in said furnace wall for discharging said alkali metal vapor from said furnace zone to said cooling means.

14. The device in accordance with claim 13, wherein said reaction zone separation means comprises a plurality of said electrolyte solids in tubular form individually having a plurality of said electrode elements in tubular form in physical contact therewith, said electrode elements collectively in electrical contact with one another.

15. The device in accordance with claim 14, wherein said electrolyte solid comprises a beta alumina electrolyte.

16. The device in accordance with claim 15, wherein said alkali metal is sodium.

17. In a method for converting heat energy to electrical energy with alkali metal serving as the working substance and which comprises: (1) generating electrons by ionizing said alkali metal to cations in a first reaction zone at one side of solid electrolyte while maintaining a temperature in said first reaction zone in a range in excess of 300° C; (2) reconverting said alkali metal cations in a second reaction zone at the other side of said solid electrolyte having porous electrode in electrical contact therewith to elemental alkali metal by permitting electron flow from said first reaction zone to said porous electrode; (3) vaporizing said elemental alkali metal from said porous electrode to a furnace zone in vapor communication therewith; (4) collecting from said furnace zone said alkali metal vapor at cooling means for condensing alkali metal adapted to maintain a temperature in a range of at least 100° C below the temperature in said first reaction zone, the improvement which comprises (A) positioning between said first reaction zone wherein alkali metal is ionized to cations and said second reaction zone wherein said ionized alkali metal is reconverted to elemental alkali metal solid electrolyte comprising at least two portions of electrolyte solids wherein each of said portions has effectively in electrical contact therewith one said porous electrode comprising electrode elements in electrical contact with one another, and wherein each of said electrolyte solids has inner and outer sides; (B) providing for series of electrical connection by permitting electron flow through an essentially isothermal conduction means between (I) said alkali metal ionizing to cations in said first reaction zone at the inner side of a first electrolyte solid of a first portion of said electrolyte solids and (II) said reconverting alkali metal cations in said second reaction zone at the outer side of a second electrolyte solid of a second portion of said electrolyte solids.

18. The method in accordance with claim 17, wherein said collecting comprises providing sufficient pressure in said furnace zone for streaming alkali metal vapor through shaped opening means and from said furnace zone to said cooling means wherein said cooling means comprises cooling areas, insulated one from another, which are sufficient in number to at least equal the number of said portions of electrolyte solids.

19. The method in accordance with claim 18 which further comprises returning said alkali metal collected in said cooling areas in portions, electrically insulated from one another, each of said portions of alkali metal returning from one cooling area, so as to place them in respective electrical contact with those inner sides of said electrolyte solids which are in the portion of electrolyte solids which have electrode elements in electrical contact with one another.

20. The method in accordance with claim 18, wherein said alkali metal to sodium.

21. The method in accordance with claim 20, wherein the sodium vapor streaming through said shaped opening means from said furnace zone exits from said furnace zone in a stream having a velocity at or near its sonic velocity.

22. A method for continuous conversion of heat energy to electrical energy using an ionizable working substance which method comprises (1) ionizing said working substance to ions in a first reaction zone at one side of solid electrolyte or porous electrode in electrical contact therewith while maintaining a temperature in said first reaction zone in excess of 100° of the lowest temperature in a second reaction zone; (2) reconverting said ions in said second reaction zone at the other side of said solid electrolyte having porous electrode in electrical contact therewith to elemental working substance; (3) vaporizing said reconverted elemental working substance from said porous electrode into a furnace zone within said second reaction zone at a temperature essentially equal to that temperature in said first reaction zone; (4) collecting said vaporized and reconverted working substance in a collection zone which is within said second reaction zone and adapted to maintain said lowest temperature, said collecting comprising streaming said vaporized and reconverted working substance from said furnace zone through shaped opening means at a rate having electrical energy associated with its reconversion which is at least three times the rate of energy associated with heat energy concurrently passing through said shaped opening means from said furnace zone to said collection zone.

* * * * *